United States Patent
Muenz et al.

(10) Patent No.: US 10,951,035 B2
(45) Date of Patent: Mar. 16, 2021

(54) COMMUNICATION-FREE DECENTRALIZED CONTROL FRAMEWORK FOR UNIT COMMITMENT IN MICROGRIDS

(71) Applicant: Siemens Aktiengesellschaft, Munich (DE)

(72) Inventors: Ulrich Muenz, Plainsboro, NJ (US); Xiaofan Wu, North Brunswick, NJ (US); Mohit Sinha, Minneapolis, MN (US); Joachim Bamberger, Stockdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/346,548

(22) PCT Filed: Oct. 12, 2018

(86) PCT No.: PCT/US2018/055638
§ 371 (c)(1),
(2) Date: May 1, 2019

(87) PCT Pub. No.: WO2019/143394
PCT Pub. Date: Jul. 25, 2019

(65) Prior Publication Data
US 2020/0403408 A1    Dec. 24, 2020

Related U.S. Application Data

(60) Provisional application No. 62/618,115, filed on Jan. 17, 2018.

(51) Int. Cl.
*G05B 19/042* (2006.01)
*H02J 3/38* (2006.01)
*H02J 13/00* (2006.01)

(52) U.S. Cl.
CPC ........... *H02J 3/38* (2013.01); *G05B 19/042* (2013.01); *H02J 13/00002* (2020.01); *G05B 2219/2639* (2013.01)

(58) Field of Classification Search
None
See application file for complete search history.

(56) References Cited

U.S. PATENT DOCUMENTS

| | | | |
|---|---|---|---|
| 2013/0162215 A1* | 6/2013 | Cooper | G05B 15/02 320/127 |
| 2014/0084686 A1* | 3/2014 | Nishibayashi | H02J 3/322 307/26 |

(Continued)

OTHER PUBLICATIONS

Arafat Md Nayeem et al: "An effective smooth transition control strategy using droop based synchronization for parallel inverters", 2013 IEEE Energy Conversion Congress and Exposition, IEEE, Sep. 15, 2013 (Sep. 15, 2013), pp. 2317-2324, XP032516171 / Sep. 23, 2013.

(Continued)

*Primary Examiner* — Jason Lin

(57) ABSTRACT

Systems, methods, and computer-readable media are described for addressing the unit commitment problem in a power grid by providing a communication-free control framework according to which each power generating unit in the power grid determines its own operating schedule for turning on or off based solely on local measurements.

20 Claims, 9 Drawing Sheets

(56) References Cited

U.S. PATENT DOCUMENTS

| | | | | |
|---|---|---|---|---|
| 2014/0103727 | A1* | 4/2014 | Taimela | H02J 3/28 307/76 |
| 2015/0069845 | A1* | 3/2015 | Liebel | H02J 3/38 307/80 |
| 2015/0288183 | A1* | 10/2015 | Villanueva, Jr. | H02J 3/005 700/291 |
| 2019/0103743 | A1* | 4/2019 | Sun | H02J 13/0086 |

OTHER PUBLICATIONS

PCT International Search Report dated Jan. 15, 2019; Application No. PCT/US2018/055638; Filing Date: Oct. 12, 2018; 13-pages.

\* cited by examiner

COMMUNICATION-FREE DECENTRALIZED CONTROL FRAMEWORK FOR UNIT COMMITMENT IN MICROGRIDS

CROSS-REFERENCE TO RELATED APPLICATION(S)

This application is a national phase filing under 35 U.S.C. § 371 of International Patent Application No. PCT/US2018/055638, filed Oct. 12, 2018, which claims the benefit of priority to U.S. Provisional Patent Application Ser. No. 62/618,115, filed Jan. 17, 2018, which are incorporated herein by reference in their entirety.

BACKGROUND

Unit commitment in power systems/microgrids is an optimization problem used to determine the operation schedule of the generating units with varying loads under different constraints and environments. For a given load profile and a given set of available generation units, the control objective is to optimize the schedule to determine when each unit should be turned on and turned off and how much power each unit should generate such that system load requirements are met and stable operation is ensured.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

The unit commitment problem for determining an operation schedule of a set of power generating units with varying loads under different constraints and environments becomes particularly challenging when communication between the power generating units is not available. Conventional approaches for solving the unit commitment problem in power systems utilize a centralized or distributed control structure, where a certain level of communication is required to exchange information between the units. Such conventional approaches are incapable of addressing the unit commitment problem in the absence of a centralized controller that enables communication between the power generating units.

Example embodiments of the invention relate to methods, systems, computer-readable media, techniques, and methodologies that address the unit commitment problem by providing a communication-free control framework according to which each power generating unit determines its own operating schedule for turning on or off based solely on local measurements. As used herein, the term communication-free may refer to the absence of any form of wireless or wired communication between power generating units. It should be appreciated, however, that other forms of communication (e.g., power-line communication) may continue to occur in a communication-free control framework in accordance with example embodiments.

A communication-free control framework in accordance with example embodiments of the invention provides a number of technical benefits/effects over conventional approaches for addressing the unit commitment problem in power systems including, for example, the capability to maintain normal operation during events that result in loss of communication (e.g., natural disasters). This technical benefit of being able to maintain a normal operating schedule in the absence of communication between the power generating units is due, at least in part, to the use of modular sub-routines executable by the power generating units during both active and inactive periods based on local measurements of an operating frequency alone, in accordance with example embodiments. The utilization of modular subroutines in accordance with example embodiments of the invention also provides the technical benefit/effect of being able to plug-and-play the subroutines in connection with the commissioning of power generating units, thereby substantially reducing the manual effort required during commissioning.

Figure 1:
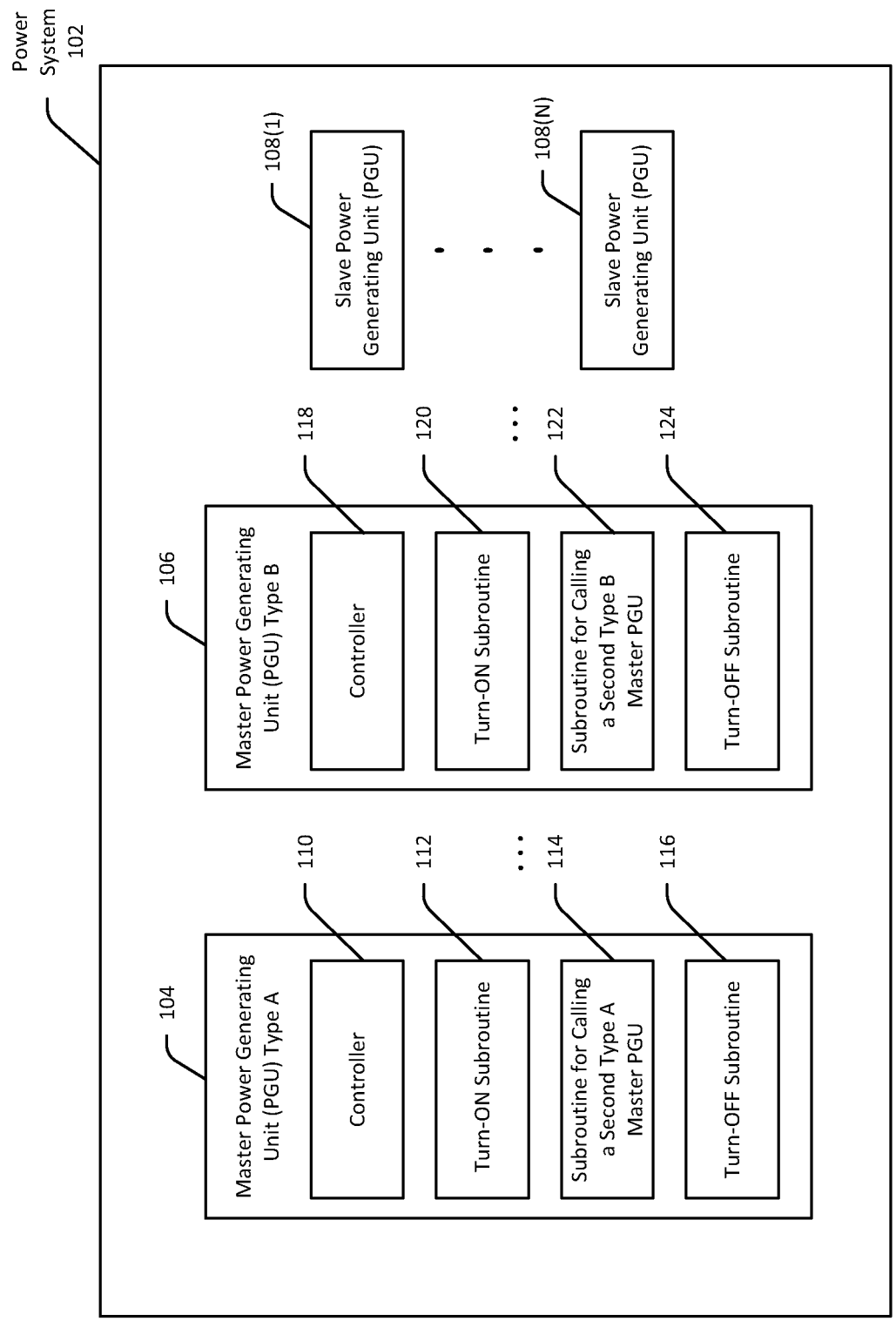
FIG. 1 is a schematic block diagram illustrating various types of power generating units of a power system and corresponding subroutines executable by the power generating units in accordance with one or more example embodiments of the disclosure.

FIG. 1 is a schematic block diagram illustrating various types of power generating units of a power system 102 and corresponding subroutines executable by the power generating units in accordance with one or more example embodiments of the disclosure. In example embodiments, the power system 102 may include one or more type A master power generating units (PGUs) 104, one or more type B master PGUs 106, and one or more slave PGUs 108(1)-108(N) (generically referred to herein as slave PGU 108). In example embodiments, a type A master PGU 104 may be a different type of PGU from a type B master PGU 106. For example, a type A master PGU 104 may be a diesel generator, a gas turbine, or the like, while a type B master PGU 106 may be battery, a fuel cell, or the like. Further, in example embodiments, the slave PGUs 108(1)-108(N) may photovoltaic cells (e.g., solar cells), wind turbines, or the like. More generally, in example embodiments, a type A master PGU 104 may be more likely to be in an active operating state (e.g., turned ON) during periods of a day when the slave PGUs 108(1)-108(N) capture less energy (e.g., early morning and evenings), while a type B master PGU 106 may be more likely to be in active operating state during periods of a day when the slave PGUs 108(1)-108(N) are capturing more energy in order to, for example, absorb excess power generated by the slave PGUs 108(1)-108(N). In example embodiments, each of the type A master PGU 104 and the type B master PGU are capable of operating in a master mode (also referred to herein as a grid-forming mode) or a slave mode (also referred to herein as a power-control mode or a P-control mode). In example embodiments, the slave PGUs 108(1)-108(N) are only capable of operating in the slave mode.

In example embodiments, a type A master PGU 104 may include a local controller 110. The local controller 110 may include one or more processing circuits, each of which may include one or more processing units or nodes. The local controller 110 may be configured to execute various subroutines including, for example, a turn-ON subroutine 112, a subroutine 114 for calling a second instance of a type A master PGU 104 to turn ON, and a turn-OFF subroutine 116. Similarly, a type B master PGU 106 may include a local controller 118. The local controller 118 may include one or more processing circuits, each of which may include one or more processing units or nodes. The local controller 118 may be configured to execute various subroutines including, for example, a turn-ON subroutine 120, a subroutine 122 for calling a second instance of a type B master PGU 106 to turn ON, and a turn-OFF subroutine 124. While a single type A master PGU 104 and a single type B master PGU 106 are illustratively depicted in FIG. 1, it should be appreciated that multiple type A master PGUs 104 and/or multiple type B master PGUs 106 may be provided as part of the power system 102. In example embodiments, each such type A master PGU 104 may include a corresponding local controller 110 configured to execute the same set of subroutines as each other type A master PGU 104. Similarly, in example embodiments, each such type B master PGU 106 may include a corresponding local controller 118 configured to execute the same set of subroutines as each other type B master PGU 106.

Figure 2:
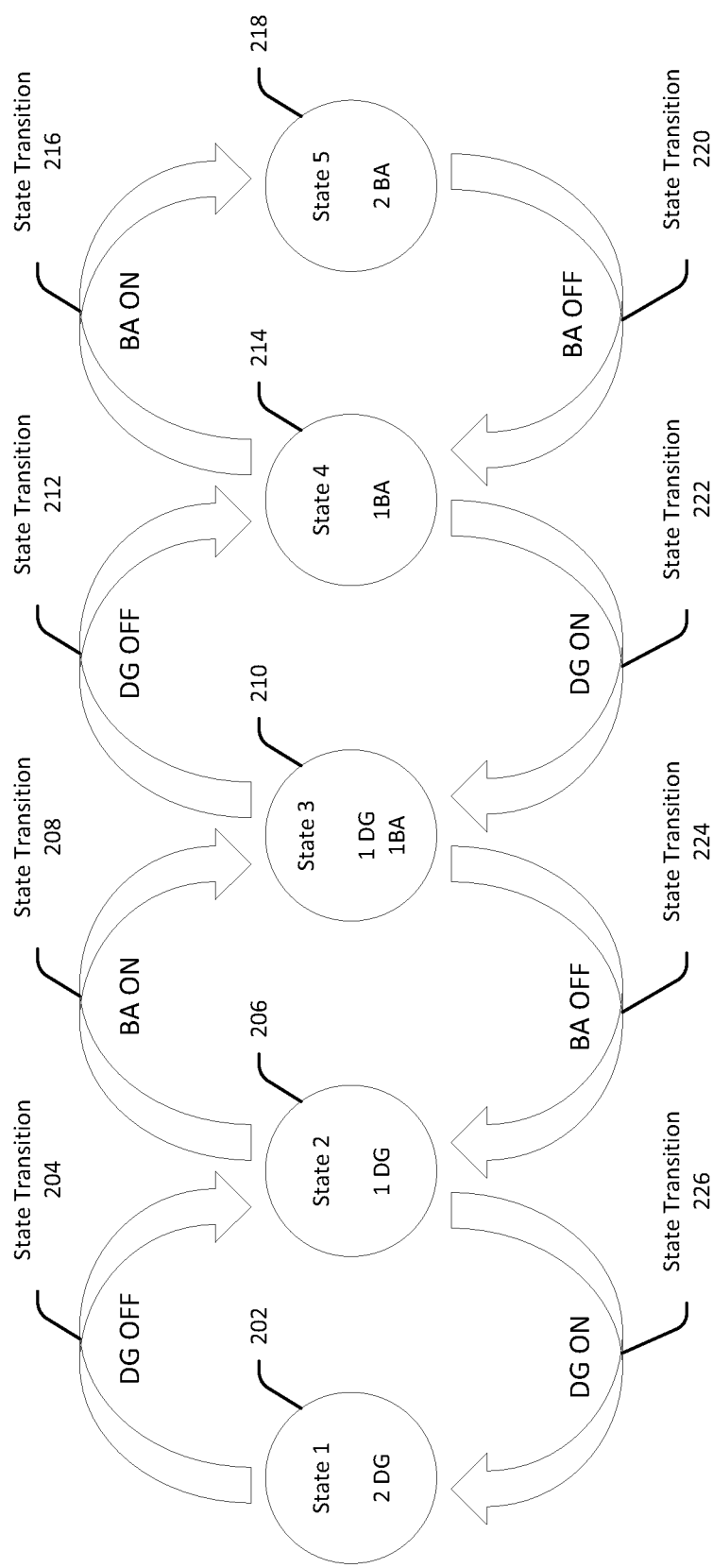
FIG. 2 is schematic diagram illustrating a series of state transitions of an example power system in accordance with one or more example embodiments of the disclosure.

FIG. 2 is schematic diagram illustrating a series of state transitions of an example power system in accordance with one or more example embodiments of the disclosure. The example power system to which the illustrative series of state transitions depicted in FIG. 2 applies may be a specific implementation of the power system 102 depicted in FIG. 1 that includes two diesel generators (DGs), two batteries (BAs), and four photovoltaic inverters (PVs). A DG may be an example of a type A master PGU 104, a BA may be an example of a type B master PGU 106, and a PV may be an example of a slave PGU 108. While this particular implementation of the power system 102 is used herein to demonstrate the operation of example embodiments of the invention, it should be appreciated that such example embodiments may be extrapolated to any number/type of type A master PGUs 104, any number/type of type B master PGUs 106, and any number/type of slave PGUs 108. A communication-free, decentralized control framework in which the type A master PGUs 104 (e.g., the two DGs) and the type B master PGUs 106 (e.g., the two BAs) execute respective subroutines to establish a coordinated operation schedule that meets system load requirements and maintains stable operation will now be described. As previously described, communication-free refers to the capability of the master PGUs of the power system 102 to establish the operation schedule and make control decisions based solely on a frequency measurement of the power system 102 (i.e., a nominal frequency of the power system 102) and local measurements of each master PGU.

In particular, in example embodiments, each master PGU may be capable of making local measurements without the need for wired or wireless communication of any sort with another PGU. For instance, a PGU may be capable of making a local measurement of its power output. In addition, in example embodiments, a PGU may not directly measure the frequency of the power system 102 (grid frequency), but rather may measure a local voltage and estimate the grid frequency from the local voltage measurement. Accordingly, references herein to detecting, determining, and/or measuring a grid frequency include estimating the grid frequency from a local voltage measurement.

FIG. 2 depicts a series of states (states 1 to 5) and various state transitions between the states for the example power system that includes 2 DGs, 2BAs, and 4 PVs. In each state, various combinations of DG(s) and/or BA(s) are in an active operating state (e.g., turned ON) or in non-active operating state (e.g., turned OFF). As part of a transition from one state to another, a DG may be turned ON or OFF or a BA may be turned ON or OFF. In example embodiments, the various states may correspond to particular time periods during a 24-hour day.

Figure 3:
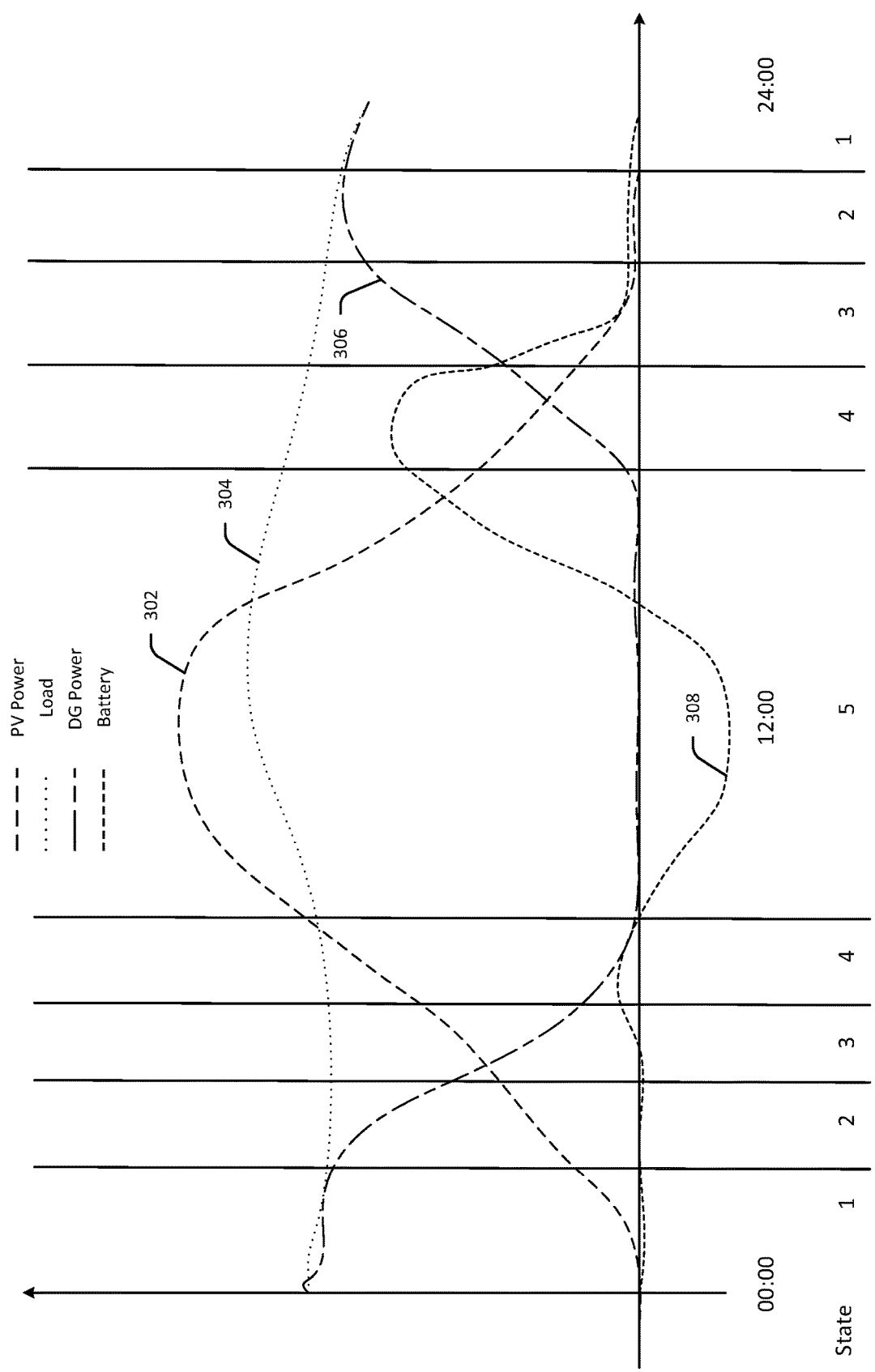
FIG. 3 is a load/power generation curve in accordance with one or more example embodiments of the disclosure.

FIG. 3 is a load/power generation curve in accordance with one or more example embodiments of the disclosure. FIG. 3 depicts the changes in the power output of the DGs, the BAs, and the PVs over the course of a 24-hour period with respect to the various power system states depicted in FIG. 2. In example embodiments, as depicted in FIG. 3, the power output 306 from the DGs may be greatest in an early morning period and a late evening/night period, which correspond to a first state 202 depicted in FIG. 2 in which 2 DGs are turned ON. In example embodiments, both DGs may be turned ON in state 202 because the PVs may be turned OFF during the time periods corresponding to state 202 due to the absence of solar irradiation. As depicted in FIG. 3, the power output 306 of the DGs decreases as the power system transitions from the first state 202 through a second state 206, a third state 210, a fourth state 214, and ultimately to a fifth state 218, in which both DGs are turned OFF and the power output 306 is zero.

In addition, in example embodiments, a power output 308 of the BAs may vary over the course of the 24-hour period as the power system transitions through the various states. For example, as depicted in FIG. 3, the power output 308 of the BAs may peak in the fifth state 218 when both BAs are turned ON and may be lowest in the first state 202 in which both BAs are turned OFF. In example embodiments, both BAs may be turned ON in the fifth state 218 in order to store excess power generated by the PVs when their power output 302 is at its peak.

In example embodiments, the PVs may be turned OFF in the first state 202 in which little or no solar irradiation is present for generating power and may be turned ON all at once or in gradual succession as the power system transitions from the first state 202 to the fifth state 218. Because the turning ON and OFF of the PVs depends only on the time of the day (e.g., the PVs are operating at maximum power point (MPP) most of the daytime), their status is not depicted in the state transition diagram of FIG. 2. In addition, a relatively constant load 304 is depicted in FIG. 3 to simplify explanation of the operating schedule of the example power system being described.

Figure 4:
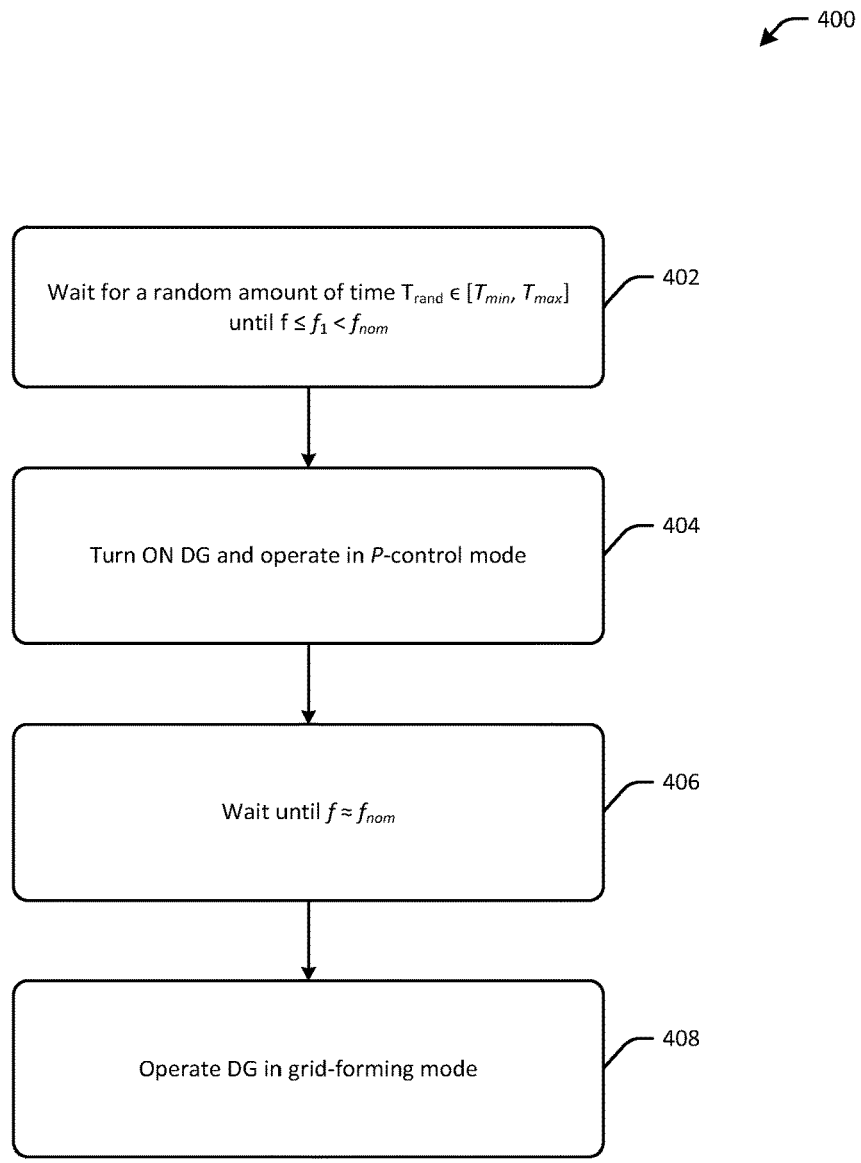
FIG. 4 is a process flow diagram of an illustrative method for implementing a subroutine for turning ON a first type of master power generating unit in accordance with one or more example embodiments of the disclosure.
Figure 5:
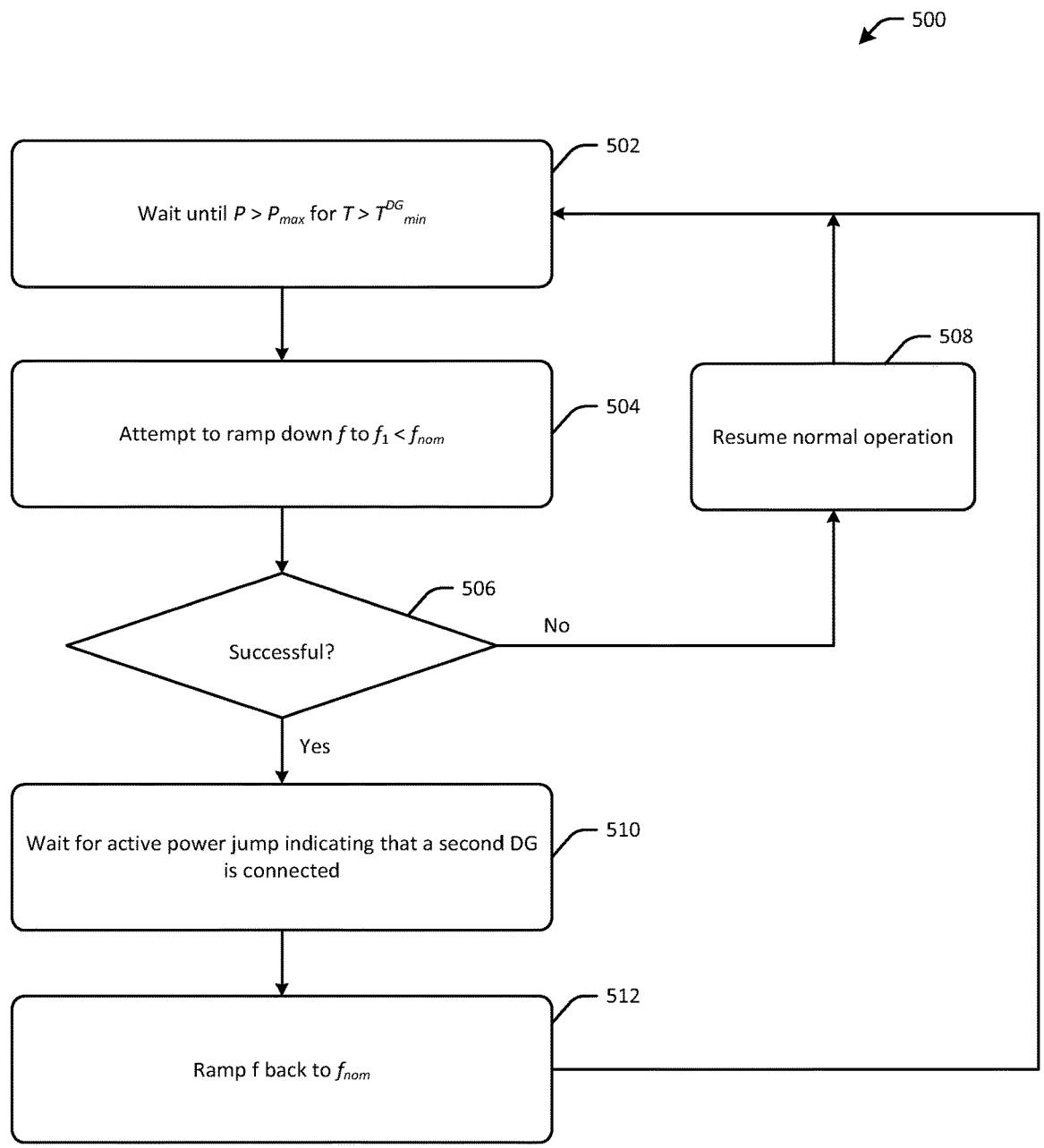
FIG. 5 is a process flow diagram of an illustrative method for implementing a subroutine for calling a second instance of the first type of master power generating unit to turn ON in accordance with one or more example embodiments of the disclosure.
Figure 6:
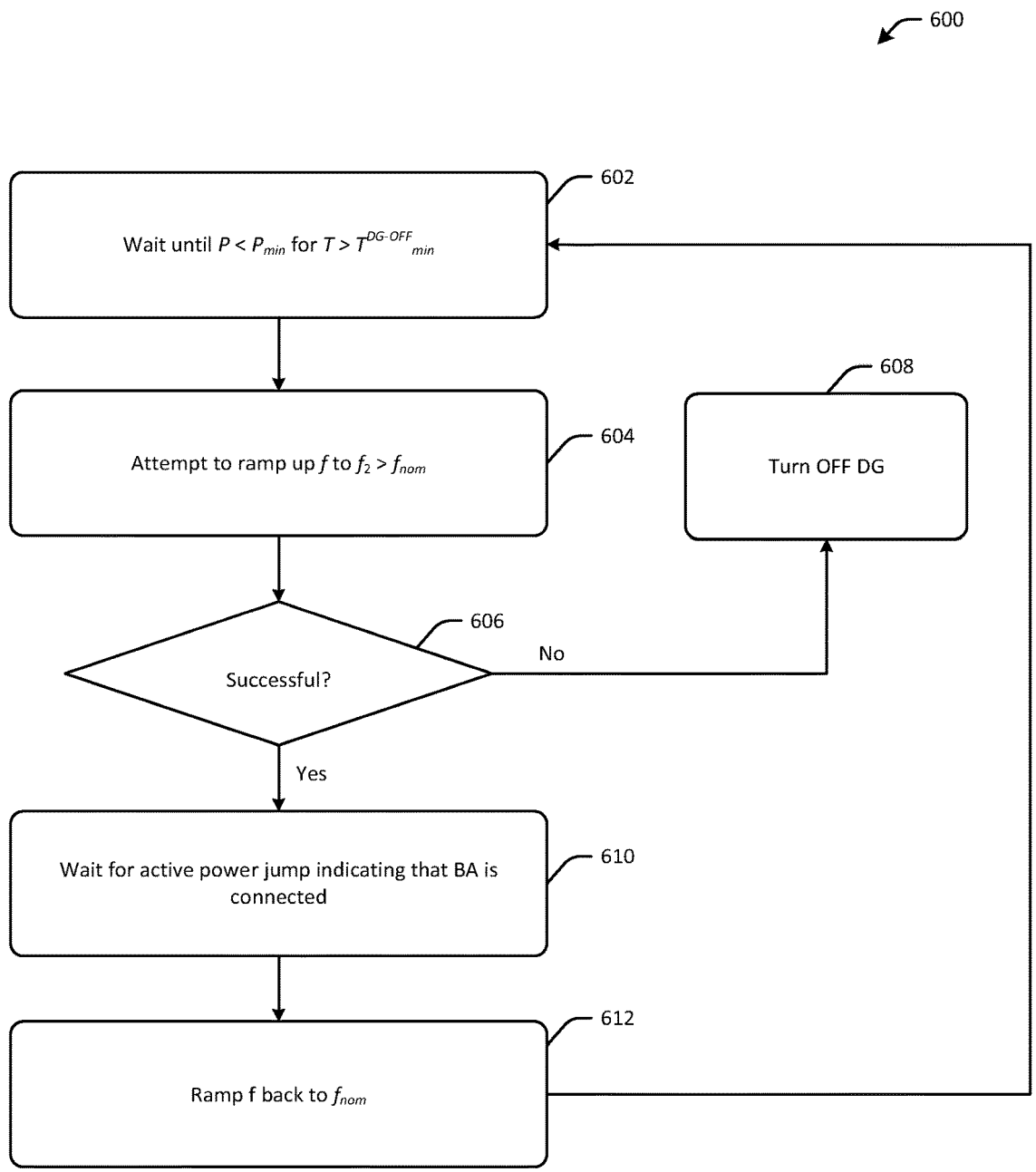
FIG. 6 is a process flow diagram of an illustrative method for implementing a subroutine for turning OFF the first type of master power generating unit in accordance with one or more example embodiments of the disclosure.
Figure 7:
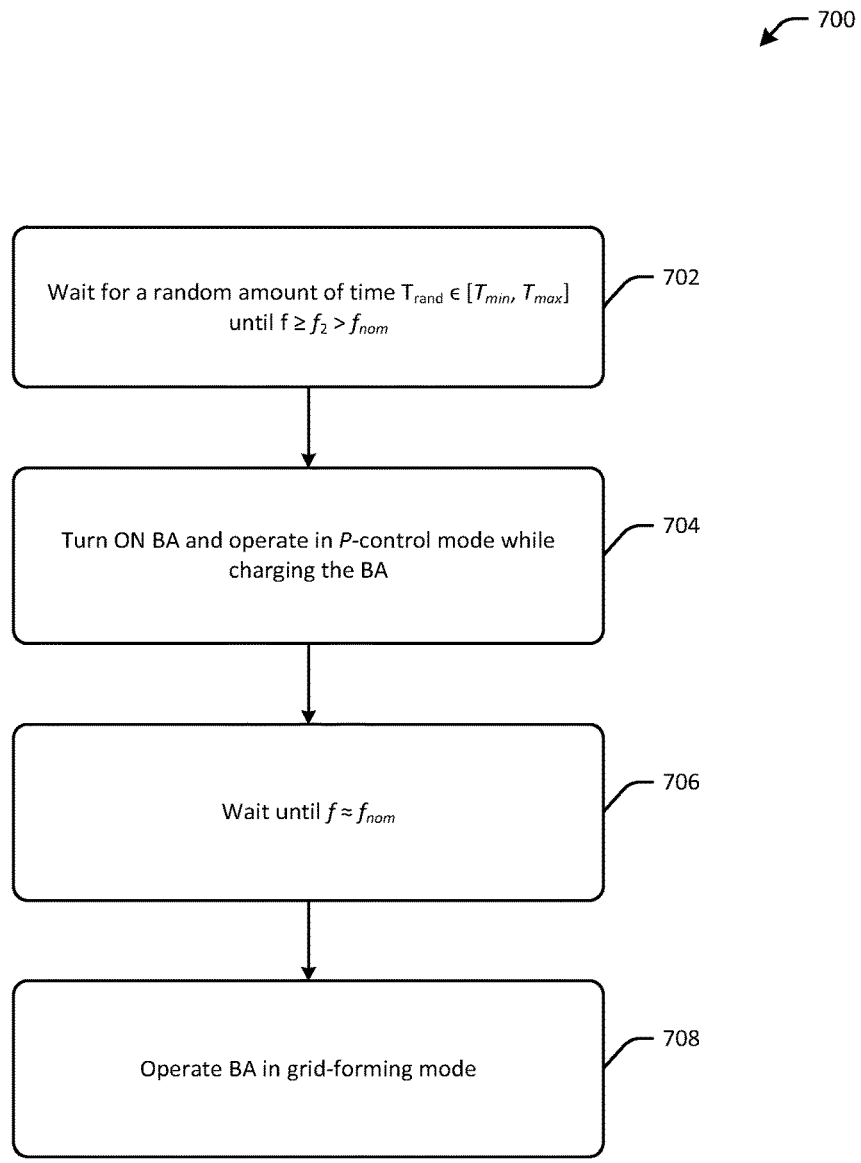
FIG. 7 is a process flow diagram of an illustrative method for implementing a subroutine for turning ON a second type of master power generating unit in accordance with one or more example embodiments of the disclosure.
Figure 8:
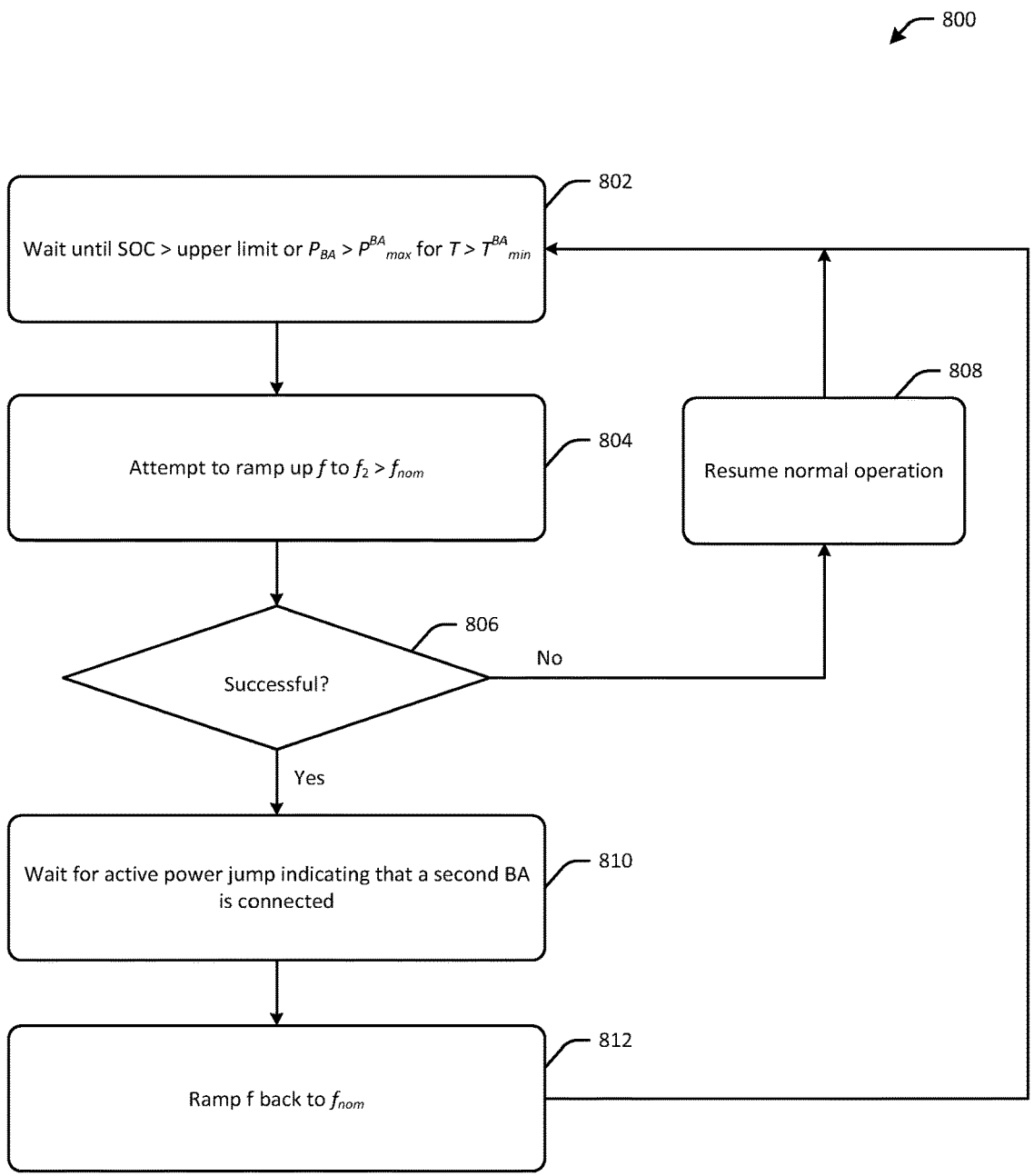
FIG. 8 is a process flow diagram of an illustrative method for implementing a subroutine for calling a second instance of the second type of master power generating unit to turn ON in accordance with one or more example embodiments of the disclosure.
Figure 9:
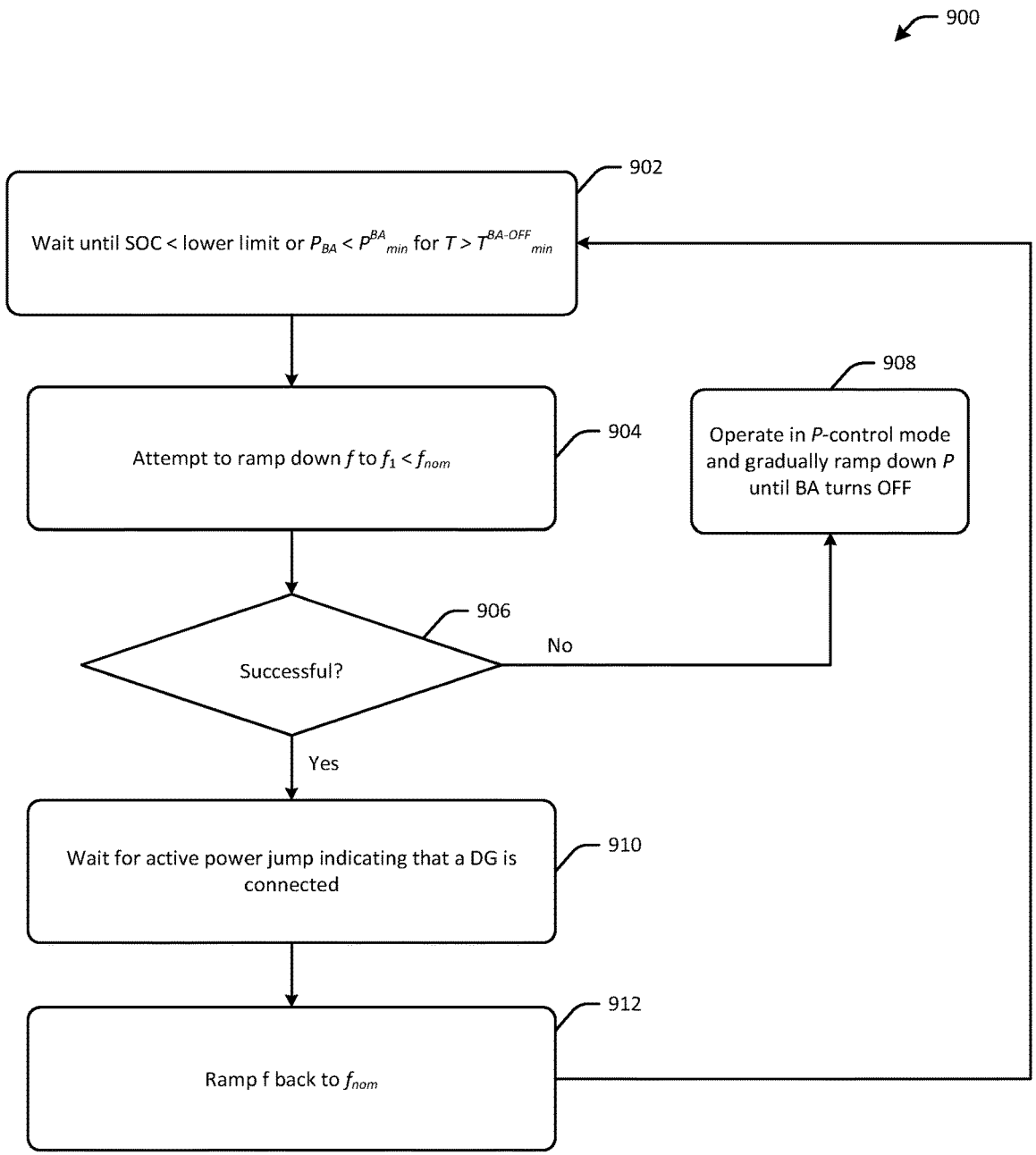
FIG. 9 is a process flow diagram of an illustrative method for implementing a subroutine for turning OFF the second type of master power generating unit in accordance with one or more example embodiments of the disclosure.

The transitions between the various states depicted in FIG. 2 for the example power system that includes 2 DGs and 2 BAs may be triggered based on execution of respective subroutines of the DGs and the BAs. In particular, FIGS. 4-6 are process flow diagrams of illustrative methods for implementing the various subroutines of a type A master PGU 104 (e.g., a DG). More specifically, FIG. 4 is a process flow diagram of an illustrative method 400 for implementing the turn-ON subroutine 112 of a type A master PGU 104; FIG. 5 is a process flow diagram of an illustrative method 500 for implementing the subroutine 114 for calling a second instance of a type A master PGU 104; and FIG. 6 is a process flow diagram of an illustrative method 600 for implementing the turn-OFF subroutine 116 of the type A master PGU 104. In addition, FIGS. 7-9 are process flow diagrams of illustrative methods for implementing the various subroutines of a type B master PGU 106 (e.g., a BA). More specifically, FIG. 7 is a process flow diagram of an illustrative method 700 for implementing the turn-ON subroutine 120 of a type B master PGU 106; FIG. 8 is a process flow diagram of an illustrative method 800 for implementing the subroutine 122 for calling a second instance of the type B master PGU 106; and FIG. 9 is a process flow diagram of an illustrative method 900 for implementing the turn-OFF subroutine 124 of the type B master PGU 106.

In example embodiments, each of the subroutines represented by the illustrative methods of FIGS. 4-6 may be executed by a local controller 110 of a type A master PGU 104 (e.g., a DG). Similarly, each of the subroutines represented by the illustrative methods of FIGS. 7-9 may be executed by a local controller 118 of a type B master PGU 106 (e.g., a BA). In example embodiments, the various subroutines may be implemented in any combination of hardware, software, and/or firmware. In certain example embodiments, one or more of the subroutines may be implemented, at least in part, as software and/or firmware that contains or is a collection of one or more program modules that include controller-executable instructions that when executed by a controller cause one or more operations to be performed. A controller (e.g., the local controller 110 and/or the local controller 118) may include one or more processing circuits, each of which may include one or more processing units or nodes. Controller-executable instructions may include computer-executable program code that when executed by a controller may cause input data contained in or referenced by the computer-executable program code to be accessed and processed to yield output data.

The various state transitions depicted in FIG. 2 for the example power system that includes 2 DGs and 2 BAs will now be described in reference to the various subroutines depicted in FIGS. 4-9. In a first state transition 204, a DG is turned OFF such that the power system transitions from the first state 202 in which both DGs are turned ON to a second state in which one of the DGs is turned OFF, leaving only one DG in an active operating state. In example embodiments, the DG that turns OFF may execute the turn-OFF subroutine 116. More specifically, each DG may execute the turn-OFF subroutine 116 until conditions are satisfied for one of the DGs to turn OFF. Once one of the DGs is turned OFF, the other DG may be prevented from turning OFF if it is the only PGU operating in a master mode (e.g., it is the only grid-forming unit that is turned ON), as will be described in more detail later in this disclosure.

Referring now to FIG. 6, at block 602 of the method 600 representative of the subroutine 116, the local controller 110 of the DG waits until the power P supplied by the DG is less than a minimum active power operational limit $P_{min}$ for the DG for an amount of time T that is greater than a threshold minimum waiting time $T^{DG\text{-}OFF}_{min}$ associated with the turn-OFF subroutine 116. In particular, in the morning, when one or more of the PV units are turned ON and slowly begin to inject more and more power into the power system, the power supplied by the DGs reduces to a point where they may eventually inject less than $P_{min}$. In example embodiments, $P_{min}$ may be, for example, 30% of a DG's rated power.

In example embodiments, when the condition of block 602 of the method 600 is met (i.e., when $P<P_{min}$ for $T>T^{DG\text{-}OFF}_{min}$), the method 600 proceeds to block 604, where the local controller 110 of the DG attempts to ramp up a main frequency f of the power system from a nominal frequency $f_{nom}$ to a frequency $f_2>f_{nom}$. For example, if $f_{nom}=60$ Hz (as is the case in the Americas and parts of Asia), then $f_2$ may be 61 Hz. As another non-limiting example, if $f_{nom}=50$ Hz (as is the case in many other parts of the world), then $f_2$ may be 51 Hz. Generally speaking, $f_{nom}$ may represent the nominal frequency of the oscillations of alternating current (AC) in an electric power grid that is transmitted from a power station to an end-user. The main frequency of a power system may also be referred to as a utility frequency or a power line frequency.

In example embodiments, at block 606 of the method 600, the local controller 110 of the DG determines whether the attempt to ramp up the main frequency f from the nominal frequency $f_{nom}$ to $f_2$ was successful. In example embodiments, attempts to ramp up (or ramp down) the main frequency f from the nominal frequency $f_{nom}$ are only successful as long as the master PGU that is attempting to adjust $f_{nom}$ is the only master PGU that is actively operating in the master mode. In particular, if multiple master PGUs are operating in the master mode, any attempt to adjust f away from $f_{nom}$ by one master PGU would be prevented by the other PGU(s) pulling the main frequency back to $f_{nom}$. In the first state 202, multiple DGs (e.g., 2 DGs) are operating in the master mode. Accordingly, the attempt to ramp up f would not be successful, and the local controller 110 would make a negative determination at block 606. The local controller 110 would then turn OFF the DG at block 608 of the method 600, completing the state transition 204 from the first state 202 in which 2 DGs are in an active operating state and operating in the master mode to the second state 206 in which only 1 DG is in an active operating state and operating in the master mode.

Referring again to FIG. 2, a next state transition 208 from the second state 206 to a third state 210 may then occur. In example embodiments, the state transition 208 involves the at least partially concurrent execution of the turn-OFF subroutine 116 by the local controller 110 of the sole DG that is turned ON in the second state 206 and execution of the turn-ON subroutine 120 by the local controller 118 of a BA. As previously noted, the turn-OFF subroutine 116 is illustratively represented by the method 600 of FIG. 6 and the turn-ON subroutine 120 is illustratively represented by the method 700 of FIG. 7. During the state transition 208, a BA may be prioritized over a DG for secondary active power reserve.

Referring again to FIG. 6, at block 602 of the method 600, the local controller 110 of the sole actively operating DG waits until $P<P_{min}$ for $T>T^{DG-OFF}_{min}$. Upon this condition being met, the method 600 proceeds to block 604, where the local controller 110 of the DG attempts to ramp up the main frequency f from $f_{nom}$ to a frequency $f_2>f_{nom}$. In this instance, because the DG is the sole master PGU operating in the master mode, the attempt to ramp up f would be successful, and a positive determination would be made at block 606 of the method 600. The method 600 then proceeds to block 610, where the local controller 110 of the DG waits to detect an active power jump indicating that a BA is connected.

Referring now to FIG. 7, at block 702 of the method 700 representative of the turn-ON subroutine 120, the local controller 118 of a BA waits for a random period of time $T_{rand} \in [T_{min}, T_{max}]$ for the main frequency f to reach $f_2>f_{nom}$. In example embodiments, $T_{min}$ and $T_{max}$ represent the minimum and maximum bounds, respectively, for the random waiting period $T_{rand}$. Because the attempt by the local controller 110 of the DG to ramp up the main frequency f was successful, the condition $f \geq f_2 > f_{nom}$ would be met during $T_{rand}$, and the method 700 would proceed to block 704, where the local controller 118 would turn ON the BA and operate the BA in a slave mode (e.g., P-control mode) while charging the BA. The method 700 would then proceed to block 706, where the local controller 118 waits for the main frequency f to return to the nominal frequency $f_{nom}$.

Referring again to FIG. 6, the local controller 110 of the DG, which is waiting at block 610 for an active power jump indicating that a BA is connected, would detect the active power jump at some point after the local controller 118 turns the BA ON and begins charging the BA at block 704 of the method 700. The method 600 would then proceed to block 612, where the local controller 110 of the DG would ramp the main frequency f back down to the nominal frequency $f_{nom}$. Referring again to FIG. 7, the local controller 118 of the BA currently operating in slave mode, which is waiting at block 706 for the main frequency f to return to the nominal frequency $f_{nom}$, subsequently detects that this has occurred after the local controller 110 of the DG ramps down f. Upon detecting that the main frequency f has returned to the nominal frequency $f_{nom}$, the local controller 118 of the BA ceases operation of the BA in the slave mode and initiates operation of the BA in the master mode, also referred to herein as the grid-forming mode. At this point, the state transition 208 from the second state 206 to the third state 210 is complete, and 1 DG and 1 BA are each operating in the master mode in the third state 210. If the DG is still running at low load, the DG can safely disconnect from the power system grid during a next execution of the turn-OFF subroutine 116, as will described in more detail hereinafter in reference to a next state transition 212 from the third state 210 to a fourth state 214.

In example embodiments, both BAs may execute the turn-ON subroutine 120 at least partially concurrently. However, in example embodiments, the BAs are prevented from simultaneously turning ON due to each BA executing the turn-ON subroutine 120 in connection with a different $T_{rand}$. More specifically, a first BA may wait, at block 702 of the method 700, for the main frequency f to be ramped up to $f_2>f_{nom}$ for a $T_{rand\_1}$ that is less than a $T_{rand\_2}$ that is randomly assigned to a second BA. As such, by virtue of having to wait for a shorter random period of time $T_{rand\_1}$, the first BA may turn ON first, operate in the slave mode while charging, and then transition to operating in the master mode after the main frequency f is returned to $f_{nom}$. At this point, in example embodiments, by the time the longer a $T_{rand\_2}$ expires, the main frequency f is back to $f_{nom}$, and the second BA would not continue with execution of the remainder of the turn-ON subroutine 120, and thus, would not turn ON. In certain other example embodiments, it may be desirable to have the BAs turn ON in a specific order, in which case, each BA may be assigned a specific $T_{rand}$. For example, if it is desired that a first BA turn ON before a second BA, the first BA may be assigned a $T_{rand\_1}$ that is ensured to be less than a $T_{rand\_2}$ assigned to a second BA. In these example embodiments, the $T_{rand}$ value for different BAs may still be randomly selected but from specific ranges of values.

Referring again to FIG. 2, the next state transition 212 that occurs from the third state 210 to the fourth state 214 may involve the execution of the turn-OFF subroutine 116 by the local controller 110 of the sole DG that is turned ON in the third state 210. As previously noted, the turn-OFF subroutine 116 is illustratively represented by the method 600 of FIG. 6. Referring again to FIG. 6, at block 602 of the method 600, the local controller 110 of the sole actively operating DG waits until $P<P_{min}$ for $T>T^{DG-OFF}_{min}$. Assuming that this DG is still supplying less than its minimal load ($P_{min}$), the condition of block 602 is met, and the method 600 proceeds to block 604, where the local controller 110 of the DG attempts to ramp up the main frequency f from $f_{nom}$ to a frequency $f_2>f_{nom}$. In this instance, because the DG is not the sole master PGU operating in the master mode (the BA turned ON as part of the previous state transition 208 is also actively operating in the master mode), the attempt to ramp up f would not be successful, and a negative determination would be made at block 606 of the method 600. The method 600 would then proceed to block 608, where the local controller 110 turns the DG OFF, resulting in the fourth state 214 in which 1 BA is the sole actively operating master PGU.

Referring again to FIG. 2, a next state transition 216 from the fourth state 214 to the fifth state 218 may then occur. The state transition 216 may involve the at least partially concurrent execution of the subroutine 122 for calling a second instance of a type B master PGU (e.g., a second BA) and the turn-ON subroutine 120 by respective instances of the local controller 118 of each BA. As previously noted, the fourth state 214 occurs during the daytime when the power generation by the PVs continually increases. As the PV power infeed continues to increase during the fourth state 214, the state of charge (SOC) of the BA actively operating in the master mode during the fourth state 214 may stay above an upper charge limit (e.g., 80% of a total charge capacity) for a threshold period of time. If this is the case, the BA that is actively operating may send a signal to a second BA for support in absorbing the excess PV power generation by attempting to ramp up the main frequency f above the nominal frequency $f_{nom}$.

More specifically, at block 802 of the method 800 representative of the subroutine 122, the local controller 118 of a first BA that is currently turned ON waits for the SOC of the first BA to be greater than an upper charge limit (SOC>upper charge limit) or for the power supplied by the first BA ($P_{BA}$) to be greater than a maximum active power operational limit for a BA ($P^{BA}_{max}$) for a period of time T that is greater than a threshold minimum waiting time ($T^{BA}_{min}$) associated with the subroutine 122. Upon determining that SOC>upper charge limit or $P_{BA}>P^{BA}_{max}$ for $T>T^{BA}_{min}$, the method 800 proceeds to block 804, where the local controller 118 of the first BA attempts to ramp up the main frequency f to $f_2>f_{nom}$. Because the first BA is the sole master PGU actively operating in the master mode in state 214, the local controller 118 of the first BA is able to successfully ramp up the frequency f, and a positive determination is made at block 806. The method 800 then proceeds to block 810, where the local controller 118 of the first BA waits to detect an active power jump indicating that a second BA is connected.

Referring now to FIG. 7, at block 702 of the method representative of the turn-ON subroutine 120, the local controller 118 of a second BA waits for a random period of time $T_{rand} \in [T_{min}, T_{max}]$ for the main frequency f to reach $f_2>f_{nom}$. Because the attempt by the local controller 118 of the first BA to ramp up the main frequency f was successful, the condition $f \geq f_2>f_{nom}$ would be met during $T_{rand}$, and the method 700 proceeds to block 704, where the local controller 118 of the second BA turns ON the second BA and operates the second BA in a slave mode (e.g., P-control mode) while charging the second BA. The method 700 then proceeds to block 706, where the local controller 118 waits for the main frequency f to return to the nominal frequency $f_{nom}$.

Referring again to FIG. 8, the local controller 118 of the first BA, which is waiting at block 810 for an active power jump indicating that a second BA is connected, detects the active power jump at some point after the local controller 118 of the second BA turns the second BA ON and begins charging the second BA at block 704 of the method 700. The method 800 then proceeds to block 812, where the local controller 118 of the first DG ramps the main frequency f back down to the nominal frequency $f_{nom}$. Referring again to FIG. 7, the local controller 118 of the second BA currently operating in slave mode, which is waiting at block 706 for the main frequency f to return to the nominal frequency $f_{nom}$, subsequently detects that this has occurred after the local controller 118 of the first BA ramps down f Upon detecting that the main frequency f has returned to the nominal frequency $f_{nom}$, the local controller 118 of the second BA ceases operation of the second BA in the slave mode and initiates operation of the second BA in the master mode, also referred to herein as the grid-forming mode. At this point, the state transition 216 from the fourth state 214 to the fifth state 218 is complete, and 2 BAs are each operating in the master mode in the fifth state 218.

In example embodiments, the series of state transitions from the first state 204 to the fifth state 218 may be reversed such that the power system ultimately transitions back from the fifth state 218 to the first state 204. The series of reverse state transitions from the fifth state 218 back to the first state 204 may correspond to portions of the 24-hour period in which solar irradiation decreases and ultimately ceases. As depicted in FIG. 2, a state transition 220 from the fifth state 218 back to the fourth state 214 may occur first as part of the series of reverse state transitions. In example embodiments, the state transition 220 may involve the execution of the turn-OFF subroutine 124 by a local controller 118 of each BA that is actively operating in the master mode in the fifth state 218. As previously noted, the turn-OFF subroutine 124 is illustratively represented by the method 900 of FIG. 9.

In example embodiments, in the afternoon, as PV power infeed begins to fall and the BAs provide sufficient power to supply the load in state 218, the SOC of the BAs may continue to fall. At block 902 of the method 900 representative of the subroutine 124, the local controller 118 of a BA that is currently turned ON waits for the SOC of the BA to be less than a lower charge limit (e.g., 30% of a total charge capacity) or for the power supplied by the BA ($P_{BA}$) to be less than a minimum active power operational limit for a BA ($P^{BA}_{min}$) for a period of time T that is greater than a threshold minimum waiting time ($T^{BA-OFF}_{min}$) associated with the subroutine 124. Upon determining that SOC<lower charge limit or $P_{BA}<P^{BA}_{min}$ for $T>T^{BA-OFF}_{min}$, the method 900 proceeds to block 904, where the local controller 118 of the BA attempts to ramp down the main frequency f to $f_1<f_{nom}$. Because the BA is not the sole master PGU actively operating in the master mode in state 218, the local controller 118 of the BA is not able to successfully ramp down the frequency f, and a negative determination is made at block 906. The method 900 then proceeds to block 908, where the local controller 118 of the BA switches operation of the BA from the master mode to the slave mode (e.g., P-control mode) and gradually ramps down the power P until the BA turns OFF. After the BA turns OFF at block 908 of the method 900, the state transition 220 from the fifth state 218 to the fourth state 214 is complete, and only one master PGU (e.g., 1 BA) is in an active operating state.

In example embodiments, following the state transition 220 from the fifth state 218 back to the fourth state 214, a state transition 222 from the fourth state 214 back to the third state 210 may occur. In example embodiments, the state transition 222 involves the at least partially concurrent execution of the turn-OFF subroutine 124 by the local controller 118 of the sole BA that is turned ON in the fourth state 214 and execution of the turn-ON subroutine 112 by the local controller 110 of a DG. As previously noted, the turn-OFF subroutine 124 is illustratively represented by the method 900 of FIG. 9 and the turn-ON subroutine 112 is illustratively represented by the method 400 of FIG. 4.

Referring again to FIG. 9, at block 902 of the method 900, the local controller 118 of the sole actively operating BA waits until SOC<lower charge limit or $P_{BA}<P^{BA}_{min}$ for $T>T^{BA-OFF}_{min}$. Upon this condition being met, the method 900 proceeds to block 904, where the local controller 118 of the BA attempts to ramp down the main frequency f from $f_{nom}$ to a frequency $f_1<f_{nom}$. In this instance, because the BA is the sole master PGU operating in the master mode, the attempt to ramp down f would be successful, and a positive determination would be made at block 906 of the method 900. The method 900 then proceeds to block 910, where the local controller 118 of the BA waits to detect an active power jump indicating that a DG is connected.

Referring now to FIG. 4, at block 402 of the method representative of the turn-ON subroutine 112, the local controller 110 of a DG waits for a random period of time $T_{rand} \in [T_{min}, T_{max}]$ for the main frequency f to reach $f_1<f_{nom}$. In example embodiments, $T_{min}$ and $T_{max}$ represent the minimum and maximum bounds, respectively, for the random waiting period $T_{rand}$. Because the attempt by the local controller 118 of the BA to ramp down the main frequency f was successful, the condition $f \leq f_1<f_{nom}$ would be met during $T_{rand}$, and the method 400 would proceed to block 404, where the local controller 110 would turn ON the DG and operate the DG in a slave mode (e.g., P-control mode). The method 400 would then proceed to block 406, where the local controller 110 waits for the main frequency f to return to the nominal frequency $f_{nom}$.

Referring again to FIG. 9, the local controller 118 of the BA, which is waiting at block 910 for an active power jump indicating that a DG is connected, would detect the active power jump at some point after the local controller 110 turns the DG ON at block 404 of the method 400. The method 900 would then proceed to block 912, where the local controller 118 of the BA would ramp the main frequency f back up to the nominal frequency $f_{nom}$. Referring again to FIG. 4, the local controller 110 of the DG currently operating in slave mode, which is waiting at block 406 for the main frequency f to return to the nominal frequency $f_{nom}$, subsequently detects that this has occurred after the local controller 118 of the BA ramps up f Upon detecting that the main frequency f has returned to the nominal frequency $f_{nom}$, the local controller 110 of the DG ceases operation of the DG in the slave mode and initiates operation of the DG in the master mode, also referred to herein as the grid-forming mode. At this point, the state transition 222 from the fourth state 214 to the third state 210 is complete, and 1 DG and 1 BA are each operating in the master mode in the third state 210.

In example embodiments, both DGs may execute the turn-ON subroutine 112 at least partially concurrently. However, in example embodiments, the DGs are prevented from simultaneously turning ON due to each DG executing the turn-ON subroutine 112 in connection with a different $T_{rand}$. More specifically, a first DG may wait, at block 402 of the method 400, for the main frequency f to be ramped down to $f_1 < f_{nom}$ for a $T_{rand\_1}$ that is less than a $T_{rand\_2}$ that is randomly assigned to a second DG. As such, by virtue of having to wait for a shorter random period of time $T_{rand\_1}$, the first DG may turn ON first, operate in the slave mode, and then transition to operating in the master mode after the main frequency f is returned to $f_{nom}$. At this point, in example embodiments, by the time the longer a $T_{rand\_2}$ expires, the main frequency f is back to $f_{nom}$, and the second DG would not continue with execution of the remainder of the turn-ON subroutine 112, and thus, would not turn ON. In certain other example embodiments, similar to as described above in relation to the BAs, it may be desirable to have the DGs turn ON in a specific order, in which case, each DG may be assigned a specific $T_{rand}$. For example, if it is desired that a first DG turn ON before a second DG, the first DG may be assigned a $T_{rand\_1}$ that is ensured to be less than a $T_{rand\_2}$ assigned to a second DG.

Referring again to FIG. 2, the next state transition 224 that occurs from the third state 210 to the second state 206 may involve the execution of the turn-OFF subroutine 124 by the local controller 118 of the BA that is currently in an active operating state. As previously noted, the turn-OFF subroutine 124 is illustratively represented by the method 900 of FIG. 9. Referring again to FIG. 9, at block 902 of the method 900, the last BA continues to operate with the SOC<lower charge limit for a period of time T. When the local controller 118 determines that SOC<lower charge limit or that $P_{BA} < P^{BA}_{min}$ for $T > T^{BA-OFF}_{min}$, the method 900 proceeds to block 904, where the local controller 118 of the BA attempts to ramp down the main frequency f from $f_{nom}$ to a frequency $f_1 < f_{nom}$. In this instance, because the BA is not the sole master PGU operating in the master mode (the DG turned ON as part of the previous state transition 222 is also actively operating in the master mode), the attempt to ramp down f would not be successful, and a negative determination would be made at block 906 of the method 900. The method 900 would then proceed to block 908, where the local controller 118 operates the BA in the slave mode (e.g., P-control mode) and gradually ramps down the power output P of the BA until the BA turns OFF, resulting in the second state 206 in which 1 DG is the sole actively operating master PGU.

Referring again to FIG. 2, a final state transition 226 from the second state 206 to the first state 202 may then occur. The state transition 226 may involve the at least partially concurrent execution of the subroutine 114 for calling a second instance of a type A master PGU (e.g., a second DG) and the turn-ON subroutine 112 by respective instances of the local controller 110 of each DG. The subroutine 114 is illustratively represented by the method 500 of FIG. 5. Further, as previously noted, the turn-ON subroutine 112 is illustratively represented by the method 400 of FIG. 4.

At night, as the PV output drops to zero, the PVs are turned off, causing the DG to supply load that is larger than a maximum active power operational limit for a DG ($P_{max}$). At block 502 of the method 500 representative of the subroutine 114, the local controller 110 of a first DG that is currently turned ON waits until a power supplied by the first DG (P) is greater than $P_{max}$ for a period of time T that is greater than a threshold minimum waiting time ($T^{DG}_{min}$) associated with the subroutine 114. Upon determining that $P > P_{max}$ for $T > T^{DG}_{min}$, the method 500 proceeds to block 504, where the local controller 110 of the first DG attempts to ramp down the main frequency f to $f_1 < f_{nom}$. Because the first DG is the sole master PGU actively operating in the master mode in state 206, the local controller 110 of the first DG is able to successfully ramp down the frequency f, and a positive determination is made at block 506. The method 500 then proceeds to block 510, where the local controller 110 of the first DG waits to detect an active power jump indicating that a second DG is connected.

Referring now to FIG. 4, at block 402 of the method 400 representative of the turn-ON subroutine 112, the local controller 110 of a second DG waits for a random period of time $T_{rand} \in [T_{min}, T_{max}]$ for the main frequency f to reach $f_1 < f_{nom}$. Because the attempt by the local controller 110 of the first DG to ramp down the main frequency f was successful, the condition $f \leq f_1 < f_{nom}$ would be met during $T_{rand}$, and the method 400 proceeds to block 404, where the local controller 110 of the second DG turns ON the second DG and operates the second DG in a slave mode (e.g., P-control mode). The method 400 then proceeds to block 406, where the local controller 110 waits for the main frequency f to return to the nominal frequency $f_{nom}$.

Referring again to FIG. 5, the local controller 110 of the first DG, which is waiting at block 510 for an active power jump indicating that a second DG is connected, detects the active power jump at some point after the local controller 110 of the second DG turns the second DG ON at block 404 of the method 400. The method 500 then proceeds to block 512, where the local controller 110 of the first DG ramps the main frequency f back up to the nominal frequency $f_{nom}$. Referring again to FIG. 4, the local controller 110 of the second DG currently operating in the slave mode, which is waiting at block 406 for the main frequency f to return to the nominal frequency $f_{nom}$, subsequently detects that this has occurred after the local controller 110 of the first BA ramps down f Upon detecting that the main frequency f has returned to the nominal frequency $f_{nom}$, the local controller 110 of the second DG ceases operation of the second DG in the slave mode and initiates operation of the second DG in the master mode, also referred to herein as the grid-forming mode. At this point, the state transition 226 from the second state 206 to the first state 202 is complete, and 2 DGs are each operating in the master mode in the first state 202.

In example embodiments, as previously described, the PVs may be turned ON in the morning and turned OFF during the night. Generally speaking, the PVs operate at the MPP unless light load conditions cause over-frequency in the system, in which case, the power supplied linearly to restore the main frequency f can be derated. As the main frequency f reaches a value $f_3>f_2>f_{nom}$, the PV(s) curtail their power in order to restore the main frequency f to $f_{nom}$. The value of $f_3$ may be chosen such that it does not conflict with the value $f_2$ used by a DG to communicate that it intends to disconnect itself from the grid. For example, if $f_2$ is 61 HZ, then $f_3$ may be 62 Hz.

In example embodiments, the direction in which the main frequency f is adjusted or attempted to be adjusted signals the direction in which a state transition is to occur. In particular, example embodiments have been described herein to indicate that adjustments or attempted adjustments to increase f above the nominal frequency $f_{nom}$ are associated with one or more state transitions moving from the first state 202 to the fifth state 218 through intermediate states, while adjustments or attempted adjustments to decrease f below the nominal frequency $f_{nom}$ are associated with one or more state transitions moving from the fifth state 218 back to the first state 202 through intermediate states. However, it should be appreciated that this can be reversed in example embodiments such that adjustments or attempted adjustments to increase f above the nominal frequency $f_{nom}$ can be associated with one or more state transitions moving from the fifth state 218 back to the first state 202 through intermediate states, while adjustments or attempted adjustments to decrease f below the nominal frequency $f_{nom}$ can be associated with one or more state transitions moving from the first state 202 to the fifth state 218 through intermediate states.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Further, functionality may be modularized differently such that processing described as being supported collectively by the various subroutines depicted in FIG. 1 may be performed by a fewer or greater number of subroutines, or functionality described as being supported by any particular subroutine may be supported, at least in part, by another subroutine. In addition, any of the functionality described as being supported by any of the subroutines depicted in FIG. 1 may be implemented, at least partially, in hardware and/or firmware across any number of PGUs.

The operations described and depicted in the illustrative methods of FIGS. 4-9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 4-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

That which is claimed is:

1. A method for decentralized unit commitment in a power system comprising a plurality of power generating units, the method comprising:
    determining a load requirement on the power system; and
    executing an operation schedule for power generation by the plurality of power generating units to meet the load requirement, wherein executing the operation schedule comprises executing, by the plurality of power generating units, a collection of subroutines that control a timing of active and inactive states of each of the plurality of power generating units based solely on local measurements made in the absence of wired and wireless communication between any of the plurality of power generating units;
    wherein executing the operation schedule comprises executing one or more subroutines of the collection of subroutines to transition another power generating unit of the plurality of power generating units from the inactive state to the active state, and wherein executing the one or more subroutines comprises:
        determining, by the first power generating unit, that a condition is met for requiring power generation support from the another power generating unit;
        performing, by the first power generating unit, a change on the power system that is detected and measured by each of the plurality of power generating units;
        determining, by a second power generating unit of the plurality of power generating units and based at least in part on the detected change on the power system and a transition rule, that the second power generating unit should transition to the active state; and
    transitioning, by the second power generating unit, to the active state.

2. The method of claim 1, wherein the condition for requiring power generation support from the another power generating unit comprises one of: i) a state-of-charge of the first power generating unit exceeding a maximum threshold state-of-charge or ii) a power output of the first power generating unit exceeding a maximum threshold power output.

3. The method of claim 1, wherein the change on the power system is one of: i) an increase in a frequency of the power system above a nominal frequency of the power system or ii) a decrease in the frequency of the power system below the nominal frequency of the power system.

4. The method of claim 3, wherein the second power generating unit is a first type of power generating unit if the change on the power system is the increase in the frequency of the power system above the nominal frequency, and wherein the second power generating unit is a second type of power generating unit if the change on the power system is the decrease in the frequency of the power system below the nominal frequency.

5. The method of claim 1, wherein the transition rule comprises requiring that each of the plurality of power generating units wait a respective random amount of time for the change on the power system to be detected, and wherein determining, by the second power generating unit and based at least in part on the detected change on the power system and the transition rule, that the second power generating unit should transition to the active state comprises detecting, by the second power generating unit, the change on the power system at an expiration of the respective random amount of time that the second power generating unit waits.

6. The method of claim 1, wherein the transition rule comprises requiring that each of the plurality of power generating units wait a respective predetermined amount of time for the change on the power system to be detected, and wherein determining, by the second power generating unit and based at least in part on the detected change on the power system and the transition rule, that the second power generating unit should transition to the active state comprises detecting, by the second power generating unit, the change on the power system at an expiration of the respective predetermined amount of time that the second power generating unit waits.

7. The method of claim 1, wherein the plurality of power generating units comprises a first power generating unit in the active state, wherein executing the operation schedule comprises executing one or more subroutines of the collection of subroutines to transition the first power generating unit from the active state to the inactive state, and wherein executing the one or more subroutines comprises:
determining, by the first power generating unit, that a condition is met for attempting to transition from the active state to the inactive state; and
verifying, by the first power generating unit, whether the transition from the active state to the inactive state can occur at least in part by attempting to perform a change on the power system, wherein the change on the power system is detected and measured by each of the plurality of power generating units.

8. The method of claim 7, wherein executing the one or more subroutines further comprises:
determining, by the first power generating unit, that the attempted change on the power system cannot be performed successfully; and
transitioning, by the first power generating unit, from the active state to the inactive state.

9. The method of claim 7, wherein the condition for attempting to transition from the active state to the inactive state comprises one of: i) a state-of-charge of the first power generating unit falling below a minimum threshold state-of-charge or ii) a power output of the first power generating unit falling below a minimum threshold power output.

10. The method of claim 7, wherein executing the one or more subroutines further comprises:
performing, by the first power generating unit, the change on the power system successfully;
detecting, by the first power generating unit, a power jump on the power system indicating that a second power generating unit of the plurality of power generating units has transitioned to the active state;
reversing, by the first power generating unit, the change on the power system;
attempting, by the first power generating unit, the change on the power system;
determining, by the first power generating unit, that the attempted change on the power system cannot be performed successfully; and
transitioning, by the first power generating unit, from the active state to the inactive state.

11. A power system configured to implement a decentralized unit commitment framework, the power system comprising a plurality of power generating units, wherein a plurality of local controllers respectively corresponding to the plurality of power generating units is configured to:
determine a load requirement on the power system; and
execute an operation schedule for power generation by the plurality of power generating units to meet the load requirement, wherein executing the operation schedule comprises executing, by the plurality of local controllers, a collection of subroutines that control a timing of active and inactive states of each of the plurality of power generating units based solely on local measurements made in the absence of wired and wireless communication between any of the plurality of power generating units;
wherein executing the operation schedule comprises executing one or more subroutines of the collection of subroutines to transition another power generating unit of the plurality of power generating units from the inactive state to the active state, and wherein executing the one or more subroutines comprises:
determining, by a first local controller of the first power generating unit, that a condition is met for requiring power generation support from the another power generating unit;
performing, by the first local controller, a change on the power system that is detected and measured by each of the plurality of power generating units:
determining, by a second local controller of a second power generating unit of the plurality of power generating units and based at least in part on the detected change on the power system and a transition rule, that the second power generating unit should transition to the active state; and
transitioning, by the second local controller, the second power generating unit to the active state.

12. The power system of claim 11, wherein the condition for requiring power generation support from the another power generating unit comprises one of: i) a state-of-charge of the first power generating unit exceeding a maximum threshold state-of-charge or ii) a power output of the first power generating unit exceeding a maximum threshold power output.

13. The power system of claim 11, wherein the change on the power system is one of:
i) an increase in a frequency of the power system above a nominal frequency of the power system or ii) a decrease in the frequency of the power system below the nominal frequency of the power system.

14. The power system of claim 11, wherein the second power generating unit is a first type of power generating unit if the change on the power system is the increase in the frequency of the power system above the nominal frequency, and wherein the second power generating unit is a second type of power generating unit if the change on the power system is the decrease in the frequency of the power system below the nominal frequency.

15. The power system of claim 11, wherein the transition rule comprises requiring that each of the plurality of power generating units wait a respective random amount of time for the change on the power system to be detected, and wherein determining, by the second local controller and based at least in part on the detected change on the power system and the transition rule, that the second power generating unit should transition to the active state comprises detecting, by the second local controller, the change on the power system at an expiration of the respective random amount of time that the second power generating unit waits.

16. The power system of claim 11, wherein the transition rule comprises requiring that each of the plurality of power generating units wait a respective predetermined amount of time for the change on the power system to be detected, and wherein determining, by the second local controller and based at least in part on the detected change on the power system and the transition rule, that the second power generating unit should transition to the active state comprises detecting, by the second local controller, the change on the power system at an expiration of the respective predetermined amount of time that the second power generating unit waits.

17. The power system of claim 11, wherein executing the one or more subroutines further comprises:
    detecting, by the first local controller, a power jump on the power system indicating that the second power generating unit has transitioned to the active state; and
    reversing, by the first local controller, the change on the power system.

18. The power system of claim 11, wherein the plurality of power generating units comprises a first power generating unit in the active state, wherein executing the operation schedule comprises executing, by one or more of the plurality of local controllers, one or more subroutines of the collection of subroutines to transition the first power generating unit from the active state to the inactive state, and wherein executing the one or more subroutines comprises:
    determining, by a first local controller of the first power generating unit, that a condition is met for attempting to transition from the active state to the inactive state; and
    verifying, by the first local controller whether the transition from the active state to the inactive state can occur at least in part by attempting to perform a change on the power system, wherein the change on the power system is detected and measured by each of the plurality of power generating units.

19. The power system of claim 18, wherein the condition for attempting to transition from the active state to the inactive state comprises one of: i) a state-of-charge of the first power generating unit falling below a minimum threshold state-of-charge or ii) a power output of the first power generating unit falling below a minimum threshold power output.

20. The power system of claim 18, wherein executing the one or more subroutines further comprises:
    performing, by the first local controller, the change on the power system successfully;
    detecting, by the first local controller, a power jump on the power system indicating that a second power generating unit of the plurality of power generating units has transitioned to the active state;
    reversing, by the first local controller, the change on the power system;
    attempting, by the first local controller, the change on the power system;
    determining, by the first local controller, that the attempted change on the power system cannot be performed successfully; and
    transitioning, by the first local controller, from the active state to the inactive state.

* * * * *